United States Patent
Cho et al.

(10) Patent No.: US 11,650,891 B2
(45) Date of Patent: *May 16, 2023

(54) PREVENTING NON-DETECTABLE DATA LOSS DURING SITE SWITCHOVER

(71) Applicant: NetApp Inc., San Jose, CA (US)

(72) Inventors: Yong Cho, Saratoga, CA (US); Prachi Deshmukh, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 17/341,446

(22) Filed: Jun. 8, 2021

(65) Prior Publication Data

US 2021/0294708 A1  Sep. 23, 2021

Related U.S. Application Data

(63) Continuation of application No. 16/281,755, filed on Feb. 21, 2019, now Pat. No. 11,036,600, which is a
(Continued)

(51) Int. Cl.
*G06F 11/20* (2006.01)
*H04L 67/1097* (2022.01)
(Continued)

(52) U.S. Cl.
CPC .......... *G06F 11/2094* (2013.01); *G06F 3/067* (2013.01); *G06F 3/0619* (2013.01); *G06F 3/0622* (2013.01); *G06F 3/0634* (2013.01); *G06F 3/0635* (2013.01); *G06F 3/0659* (2013.01); *G06F 11/1451* (2013.01); *G06F 11/1464* (2013.01); *G06F 11/1469* (2013.01); *G06F 11/1662* (2013.01);
(Continued)

(58) Field of Classification Search
CPC ............. G06F 11/2069; G06F 11/2046; G06F 11/2071; G06F 11/1469; G06F 11/1451; G06F 11/2094; G06F 11/2035; G06F 11/1662; G06F 11/1464
See application file for complete search history.

(56) References Cited

U.S. PATENT DOCUMENTS 5,696,895 A   12/1997  Hemphill et al.
5,781,716 A    7/1998  Hemphill et al.
(Continued)

*Primary Examiner* — Nadeem Iqbal
(74) *Attorney, Agent, or Firm* — Cooper Legal Group, LLC

(57) ABSTRACT

Methods, systems, and computer program products for preventing non-detectable data loss during site switchover are disclosed. A computer-implemented method may include receiving a request to perform a switchover from a first node to a second node, determining whether to place a storage volume involved in the switchover in a suspended state, setting the storage volume in the suspended state based on determining that the storage volume is to be placed in the suspended state, and maintaining the storage volume in the suspended state after completing the switchover. In an example, the storage volume may be placed in a suspended state based on examining a volume-specific attribute indicating whether the storage volume is to be suspended when involved in a switchover. In one example, each storage volume involved in a switchover may be placed in a suspended state when indicated as part of a switchover request.

20 Claims, 5 Drawing Sheets

Related U.S. Application Data continuation of application No. 15/165,033, filed on May 26, 2016, now Pat. No. 10,223,223, which is a continuation of application No. 14/265,592, filed on Apr. 30, 2014, now Pat. No. 9,389,968.

(51) Int. Cl.

| | |
|---|---|
| *H04L 69/40* | (2022.01) |
| *G06F 3/06* | (2006.01) |
| *G06F 11/14* | (2006.01) |
| *H04L 65/40* | (2022.01) |
| *G06F 11/16* | (2006.01) |

(52) U.S. Cl.
CPC .......... *G06F 11/20* (2013.01); *G06F 11/2035* (2013.01); *G06F 11/2069* (2013.01); *G06F 11/2071* (2013.01); *H04L 65/40* (2013.01); *H04L 67/1097* (2013.01); *H04L 69/40* (2013.01); *G06F 11/2046* (2013.01); *G06F 11/2097* (2013.01); *G06F 2201/805* (2013.01); *G06F 2201/82* (2013.01); *G06F 2212/1032* (2013.01); *G06F 2212/163* (2013.01); *G06F 2212/263* (2013.01)

(56) References Cited

U.S. PATENT DOCUMENTS

| | | | |
|---|---|---|---|
| 5,930,824 | A | 7/1999 | Anglin et al. |
| 6,801,992 | B2 | 10/2004 | Gajjar et al. |
| 7,024,587 | B2 | 4/2006 | Elko et al. |
| 7,213,246 | B1 | 5/2007 | Van Rietschote et al. |
| 7,257,091 | B2 | 8/2007 | Elko et al. |
| 7,765,370 | B2 | 7/2010 | Iwamura et al. |
| 7,778,986 | B2 | 8/2010 | Bish et al. |
| 7,962,915 | B2 | 6/2011 | Eshel et al. |
| 8,086,895 | B2 * | 12/2011 | Maki .................. G06F 11/2087 714/4.11 |
| 8,296,599 | B1 | 10/2012 | Boyer et al. |
| 8,327,186 | B2 | 12/2012 | Coatney et al. |
| 8,370,588 | B2 | 2/2013 | Nakajima et al. |
| 8,707,085 | B2 | 4/2014 | Bodke et al. |
| 8,738,701 | B2 | 5/2014 | Padmanaban et al. |
| 8,751,863 | B2 | 6/2014 | Calder et al. |
| 9,253,046 | B2 | 2/2016 | Elko et al. |
| 9,389,968 | B2 | 7/2016 | Cho et al. |
| 10,223,223 | B2 | 3/2019 | Cho et al. |
| 2010/0077249 | A1 | 3/2010 | Das et al. |
| 2010/0281229 | A1 | 11/2010 | Iwamura et al. |
| 2014/0047263 | A1 | 2/2014 | Coatney et al. |

* cited by examiner

PREVENTING NON-DETECTABLE DATA LOSS DURING SITE SWITCHOVER

RELATED APPLICATION

This application claims priority to and is a continuation of U.S. patent application Ser. No. 16/281,755, filed on Feb. 21, 2019 and titled "PREVENTING NON-DETECTABLE DATA LOSS DURING SITE SWITCHOVER," which claims priority to and is a continuation of U.S. Pat. No. 10,223,223, filed on May 26, 2016 and titled "PREVENTING NON-DETECTABLE DATA LOSS DURING SITE SWITCHOVER," which claims priority to and is a continuation of U.S. Pat. No. 9,389,968, filed on Apr. 30, 2014 and titled "PREVENTING NON-DETECTABLE DATA LOSS DURING SITE SWITCHOVER," which are incorporated herein by reference.

TECHNICAL FIELD

Examples of the present disclosure generally relate to computer systems, and more specifically, relate to preventing non-detectable data loss in high availability data storage.

BACKGROUND

A storage server is a computer system that performs data storage and retrieval for clients over a network. For example, a storage server may carry out read and write operations on behalf of clients while interacting with storage controllers that transparently manage underlying storage resources (e.g., disk pools). Two methods of providing network accessible storage include network-attached storage (NAS) and storage area networks (SANs).

Network-attached storage (NAS) is a file-level storage system that provides clients with data access over a network. In addition, a storage area network (SAN) is a type of specialized high-speed network that interconnects clients with shared storage resources. Either type of distributed storage system may include storage controllers that implement low-level control over a group of storage drives to provide virtualized storage.

Storage nodes may be clustered together to provide high-availability data access. For example, two storage nodes may be configured so that when one node fails, the other node continues processing without interruption. In addition, different sets of clustered storage may exist in different locations to provide disaster recovery (DR) in the event of failure or loss of communication at one site. In certain scenarios, non-detectable data loss may occur when updates on one node are not transferred to a DR site before site switchover occurs.

BRIEF DESCRIPTION OF THE DRAWINGS

The present disclosure is illustrated by way of example, and not by way of limitation, and can be understood more fully from the detailed description given below and from the accompanying drawings of various examples provided herein. In the drawings, like reference numbers may indicate identical or functionally similar elements. The drawing in which an element first appears is generally indicated by the left-most digit in the corresponding reference number.

DETAILED DESCRIPTION

Figure 1:
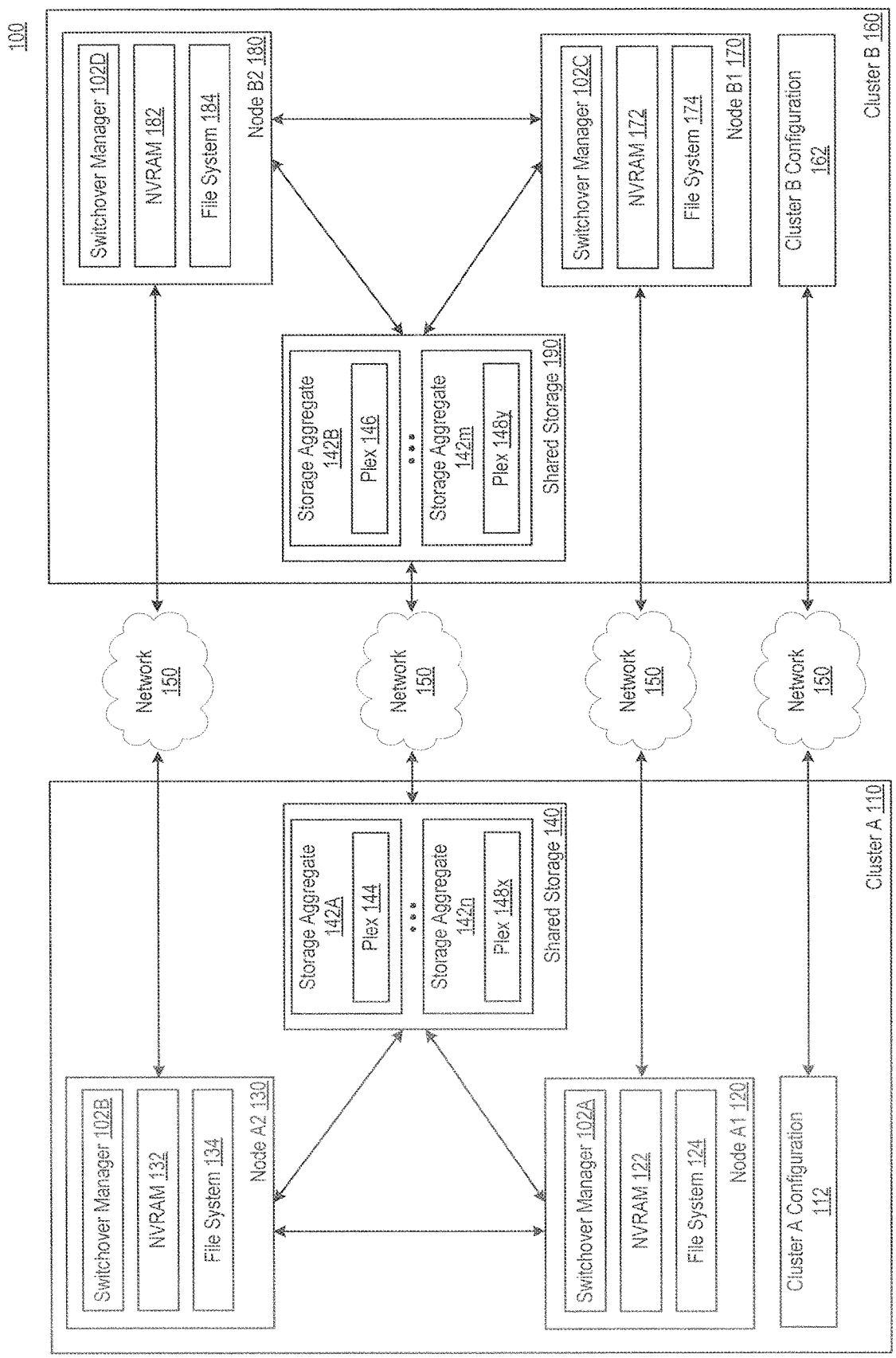
FIG. 1 illustrates an example system architecture for preventing non-detectable data loss during site switchover, in accordance with various examples of the present disclosure.

Disclosed herein are systems, methods, and computer program products for preventing non-detectable data loss when performing failover across sites. More specifically, a volume-specific attribute is provided for each of a plurality of storage volumes to indicate whether to suspend each volume as part of a switchover between disaster recovery sites. The volume-specific attribute is examined for each of the storage volumes as part of a switchover operation and volumes are placed in a suspended state accordingly. Further, operations are not automatically resumed after switchover on a corresponding disaster recovery volume of a suspended volume until the suspended state is cleared.

In an example, two high-availability (HA) storage clusters are configured as disaster recovery (DR) partners at different sites connected via a high-speed network. Each cluster processes its own client requests independently and can assume operations of its DR partner when an outage occurs. Transactions performed on each cluster are replicated to the other respective cluster, thus allowing seamless failover during a site outage.

In an example, non-detectable data loss may occur when network communication is disrupted between sites prior to switchover. For example, a network issue may interrupt data replication so that some updates do not reach a failover site before site switchover occurs. In such scenarios, the failover site is unaware of undelivered updates and unknowingly begins processing requests with an incomplete data set after switchover. Such non-detectable data loss could result in errors and business disruption in financial, manufacturing, and other types of systems where data loss is unacceptable.

In an example, non-detectable data loss may be prevented by providing a volume-specific storage attribute, which allows a user to indicate that a storage volume is to be placed in a suspended state in response to a switchover. In one example, the volume-specific storage attribute is examined for a volume, and the volume is placed in a suspended state during a switchover when indicated by the attribute. The volume is maintained in the suspended state after the switchover is complete to allow data recovery, data validation or other intervention before processing resumes on the volume. In one example, a switchover request may indicate that every volume involved in a switchover is to be placed in a suspended state.

Various illustrations of the present disclosure will be understood more fully from the detailed description given below and from the accompanying drawings of various examples described herein. In the drawings, like reference numbers may indicate identical or functionally similar elements. The drawing in which an element first appears is generally indicated by the left-most digit in the corresponding reference number.

FIG. 1 illustrates an example system architecture for preventing non-detectable data loss during site switchover, in accordance with various examples of the present disclosure. System architecture 100 includes cluster A 110, cluster B 160, and network 150.

Any component or combination of components in cluster A 110 or cluster B 160 may be part of or may be implemented with a computing device. Examples of computing devices include, but are not limited to, a computer, workstation, distributed computing system, computer cluster, embedded system, stand-alone electronic device, networked storage device (e.g., a storage server), mobile device (e.g. mobile phone, smart phone, navigation device, tablet or mobile computing device), rack server, storage controller, set-top box, or other type of computer system having at least one processor and memory. Such a computing device may include software, firmware, hardware, or a combination thereof. Software may include one or more applications and an operating system. Hardware may include, but is not limited to, one or more processors, types of memory and user interface displays.

A storage controller is a specialized computing device that provides clients with access to centralized storage resources. A storage controller usually presents clients with logical volumes that appear as a single unit of storage (e.g., a storage drive, such as a solid-state drive (SSD) or a disk). However, logical volumes may be comprised of one or more physical storage drives. For example, a single logical volume may be an aggregation of multiple physical storage drives configured as a redundant array of independent disks (RAID). RAID generally refers to storage technology that combines multiple physical storage drives into a single logical unit, for example, to provide data protection and to increase performance. In an example, a storage server may operate as part of or on behalf of network attached storage (NAS), a storage area network (SAN), or a file server. Further, a storage server also may be referred to as a file server or storage appliance.

Cluster A 110 includes cluster A configuration 112, node A1 120, node A2 130, and shared storage 140. Cluster B 160 includes cluster B configuration 162, node B1 170, node B2 180, and shared storage 190. A cluster generally describes a set of computing devices that work together for a common purpose while appearing to operate as a single computer system. Clustered computing devices usually are connected via high-speed network technology, such as a fast local area network (LAN) or fibre channel connectivity. Clustering generally may be used, for example, to provide high-performance and high availability computing solutions.

In an example, cluster A 110 is a high availability (HA) cluster at one geographic location or "site" that uses node A1 120 and node A2 130 as a high availability (HA) pair of computing devices to provide access to computer systems, platforms, applications and/or services with minimal or no disruption. Similarly, cluster B 160 also is a high availability (HA) cluster at a different geographic location or "site" than cluster A 110, which uses node B1 170 and node B2 180 as a high availability (HA) pair to provide access to computer systems, platforms, applications and/or services at a different location with minimal or no disruption.

In an example, cluster A 110 and cluster B 160 each may provide users with physical and/or virtualized access to one or more computing environments, networked storage, database servers, web servers, application servers, software applications or computer programs of any type, including system processes, desktop applications, web applications, applications run in a web browser, web services, etc.

While cluster A 110 and cluster B 160 each provide high availability (HA) services for a site, each cluster itself is susceptible to disruptive events that can occur at a particular location. For example, an entire site may become unavailable for one or more various reasons, including an earthquake, a hurricane, a flood, a tornado, a fire, an extended power outage, a widespread network outage, etc. In addition, a site may need to be shutdown periodically for maintenance or other purposes, such as relocation.

To provide additional redundancy and increased resiliency against natural disasters and other events that may impact site availability, cluster A 110 and cluster B 160 may be configured as disaster recovery (DR) partners. In an example, cluster B 160 serves as a disaster recovery (DR) partner for cluster A 110 (and vice versa). For example, cluster A 110 may be located at a first site (e.g., San Francisco) and cluster B 160 may be located at a second site 50-100 miles away (e.g., San Jose). Transactions occurring on cluster A 110 are replicated or copied to cluster B 160 over network 150 and then replayed on cluster B 160 to keep the two clusters synchronized. Thus, when a site outage occurs or cluster A 110 is unavailable for some reason, cluster B 160 may take over operations for cluster A 110 (and vice versa) via an automated or manual switchover.

A switchover generally refers to switching or transferring processing from one computing resource (e.g., a computer system, cluster, network device, etc.), to another redundant or backup computing resource. The terms "switchover" and "switchover operation" generally refer to manual, semi-automated, or automated switchover processing. In an example, forms of automated and semi-automated switchover sometimes may be referred to as "failover."

In the example described above, cluster B 160 serves as a disaster recovery (DR) partner for cluster A 110. Similarly, cluster A 110 also may serve as a disaster recovery (DR) partner for cluster B 110. In one example, cluster A 110 and cluster B 160 each may receive and process their own user requests. Transactions occurring at each respective site may be replicated or copied to the other disaster recovery (DR) partner, and the disaster recovery (DR) partner may assume or takeover operations when switchover occurs.

In an example, transactions from one cluster are replicated or copied across a network 150 to a disaster recovery (DR) partner at a different location. Network 150 may generally refer to a public network (e.g., the Internet), a private network (e.g., a local area network (LAN), a metropolitan area network (MAN), a wide area network (WAN)), fibre channel communication, an inter-switch link, or any combination thereof. In an example, network 150 is a redundant high-speed interconnect between cluster A 110 and cluster B 160.

In an example, configuration information is synchronized with a disaster recovery (DR) partner to ensure operational consistency in the event of a switchover. For example, cluster configuration data may be indicated by an administrator upon configuration and then periodically updated. Such data may be stored as metadata in a repository that is local to a cluster. However, to provide consistent and uninterrupted operation upon switchover to a DR partner cluster at a different site, configuration information should be synchronized between the clusters.

In an example, cluster A configuration 112 data is synchronized with cluster B configuration 162 data when cluster A 110 and cluster B 160 are disaster recovery (DR) partners. For example, cluster A configuration 112 data and associated updates may be replicated or copied to cluster B configuration 162 (and vice versa) so that cluster A configuration 112 data and cluster B configuration data 162 are identical and either cluster may assume operations of the other without complication or interruption upon switchover.

In an example, node A1 120 and node A2 130 are computing devices configured as a high availability (HA) pair in cluster A 110. Similarly, node B1 170 and node B2 180 also are configured as a high availability (HA) pair in cluster B 160. Each of node A1 120, node A2 130, node B1 170 and node B2 180 may be specialized computing devices, such as storage controllers or computing devices that interact with one or more storage controllers.

A high availability (HA) pair generally describes two nodes that are configured to provide redundancy and fault tolerance by taking over operations and/or resources of a HA partner to provide uninterrupted service when the HA partner becomes unavailable. In an example, a HA pair may be two storage systems that share multiple controllers and storage. The controllers may be connected to each other via a HA interconnect that allows one node to serve data residing on disks of a failed HA partner node. Each node may continually monitor its partner and mirror non-volatile memory (NVRAM) of its partner. The term "takeover" may be used to describe the process where a node assumes operations and/or storage of a HA partner. Further, the term "giveback" may be used to describe the process where operations and/or storage is returned to the HA partner.

Each node in cluster A 110 and cluster B 160 includes its own local copy of non-volatile random-access memory (NVRAM). For example, node A1 120 includes NVRAM 122, node A2 130 includes NVRAM 132, node B1 170 includes NVRAM 172, and node B2 180 includes NVRAM 182. Non-volatile memory generally refers to computer memory that retains stored information even when a computer system is powered off.

One type of NVRAM is static random access memory (SRAM), which is made non-volatile by connecting it to a constant power source, such as a battery. Another type of NVRAM uses electrically erasable programmable read-only memory (EEPROM) chips to save contents when power is off. EEPROM memory retains contents even when powered off and can be erased with electrical charge exposure. Other NVRAM types and configurations exist and can be used in addition to or in place of the previous illustrative examples.

In an example, when a client performs a write operation, a responding node (e.g., node A1 120) first writes the data to its local NVRAM (e.g., NVRAM 122) instead of writing the data to a storage drive. A node first may write data to local NVRAM and then periodically flush its local NVRAM to a storage drive to provide faster performance. NVRAM protects the buffered data in the event of a system crash because NVRAM will continue to store the data even when a node is powered off.

To further protect against potential data loss, local NVRAM also may be mirrored on a HA partner. For example, contents of NVRAM 132 of node A2 130 are replicated or copied to NVRAM 122 of node A1 120 on cluster A 110. Thus, if node A2 130 were to fail, a copy of NVRAM 132 exists in NVRAM 122 and may be replayed (e.g., extracted and written to storage volume) by node A1 120 to prevent data loss.

Similarly, local NVRAM also may be mirrored on a node of another cluster at a different site, such as a disaster recovery (DR) partner, to provide two-way NVRAM mirroring. For example, NVRAM 132 of node A2 130 may be mirrored replicated or copied to both NVRAM 122 of node A1 120 and also to NVRAM 182 of node B2 180 on cluster B 160. In an example, Cluster A 110 may fail and an administrator may perform a switchover to cluster B 160. Since node B2 180 has a copy of NVRAM 132 from node A2 130 in NVRAM 182, the replicated data from NVRAM 132 can be replayed (e.g., extracted and written to a storage volume) as part of the switchover operation to avoid data loss.

In an example, NVRAM of each node is divided into a plurality of partitions. For example NVRAM of a node may be divided into four partitions. A first NVRAM partition may be a local partition that stores buffered data for the node. A second NVRAM partition may be a copy of a HA partner's NVRAM. A third NVRAM partition may be a copy of a DR partner's NVRAM. A fourth NVRAM partition may be a working area used to hold data as it is flushed to disk.

In cluster A 110, both node A1 120 and node A2 130 access shared storage 140. Shared storage 140 of cluster A 110 includes storage aggregates 142A . . . 142n. Similarly, both node B1 170 and node B2 180 access shared storage 190 of cluster B 160. Shared storage 190 of cluster B 160 includes storage aggregates 142B . . . 142m. In one example, shared storage 140 and shared storage 190 may be part of the same storage fabric, providing uninterrupted data access across different sites via high speed metropolitan and/or wide area networks.

Storage aggregate 142A includes plex 144, and storage aggregate 142B includes plex 146. A plex generally describes storage resources used to maintain a copy of mirrored data. In one example, a plex is a copy of a file system. Further, plexes of a storage aggregate may be synchronized, for example by using simultaneous updates or replication, so that the plexes are maintained as identical.

Storage aggregates 142n and 142m generally represent that a plurality of storage aggregates may exist across different sites. For example, each general storage aggregate may be comprised of multiple, synchronized plexes (e.g., an instance of plex 148x and an instance of plex 148y) in different locations.

In an example, some storage aggregates are owned by a node in one location (e.g., cluster A 110), while other storage aggregates are owned by another node in a different location (e.g., cluster B 160). In one example, a node in cluster A 110 (e.g., node A1 120) owns a storage aggregate (e.g., storage aggregate 142A, 142B). The storage aggregate includes a plex 144 in cluster A 110 and a plex 146 in cluster B 160, which also are owned by node A1 120. In one example, node A1 120 writes to the plexes, which may not be accessed by disaster recover partner node B1 170 until ownership of the storage aggregate and plexes are changed, for example, as part of a switchover.

As an example, plex locality is generally descriptive and usually based on a plex's location relative to a controlling node (e.g., a node that owns the storage aggregate associated with the plex). For example, a plex associated with cluster A 110 would be local to a controlling node in cluster A 110 while a plex in cluster B 160 would be remote to the controlling node in cluster A 110. Similarly, plex locality described in the previous example would be reversed when the controlling node is located in cluster B 160.

In an example, storage aggregate 142A and storage aggregate 142B each are part of a single storage aggregate spanning across sites (e.g., cluster A 110 and cluster B 160). In one example, a storage aggregate is created as a synchronized RAID mirror. A synchronized RAID mirror generally refers to a configuration where different copies of mirrored data are kept in sync, for example, at a single location or across different sites (i.e., geographic locations). In addition, RAID (redundant array of independent disks) generally refers to storage technology that combines multiple storage drives into a logical unit for data protection and faster performance.

In an example, storage aggregate 142A and storage aggregate 142B belong to the same storage aggregate owned by a single node. In one example, node A2 130 owns storage aggregates 142A and 142B and writes data to plex 144. The data updates then are replicated to cluster B 160 and applied to plex 146 to keep plex 144 and plex 146 synchronized. Thus, when a switchover occurs, a disaster recover (DR) partner has a mirrored copy of the other site's data and may take over and resume operations of the other site with little or no disruption.

In an example, node A1 120, node A2 130, node B1 170 and node B2 180 each include a respective switchover manager (e.g., switchover manager 102A-102D). Switchover manager 102A-102D is computer software that manages switchover operations between cluster A 110 and cluster B 160. In an example, switchover manager 102A-102D may be part of an operating system (OS) running on a node, may include one or more extensions that supplement core OS functionality, and also may include one or more applications that run on an OS. In one example, switchover manager 102A-102D is provided as part of a storage operating system that runs on a node.

In an example, node A1 120, node A2 130, node B1 170 and node B2 180 each include a respective file system (file system 124, file system 134, file system 174 and file system 184). A file system generally describes computer software that manages organization, storage and retrieval of data. A file system also generally supports one or more protocols that provide client access to data. In some examples, a write-anywhere file system, such as the Write Anywhere File Layout (WAFL®) may be used. In an example, a file system such as WAFL® may be used to create, format, maintain, manage, copy and perform various operations on logical volumes that are allocated and provided from one or more physical storage resources.

In an example, various switchover manager operations may be implemented independent of a file system, as part of a file system, or in conjunction with a file system. In one example, a switchover manager uses file system information and features (e.g., file system attributes and functionality) when performing a switchover.

In an example, an administrator invokes switchover functionality by issuing a switchover command using a command line or graphical user interface (GUI). For example, an administrator may issue a switchover command either prior to or after an outage occurs on a cluster at a specific site to transfer operations from the cluster to another cluster at a different site. In some examples, site switchover may occur in response to an outage or other condition detected by a monitoring process. For example, a monitoring process running at a disaster recovery site or another non-local site may trigger a switchover when site availability is disrupted or site performance is inadequate.

In an example, a planned or unplanned outage may occur at the site of cluster A 110. A system administrator ("administrator") issues a switchover command from a node on cluster B 160 to invoke switchover manager functionality that transfers operations from cluster A 110 to cluster B 160. For example, the administrator may issue the switchover command either from node B1 170 to invoke switchover manager 102C or from node B2 180 to invoke switchover manager 102D, regardless of which node is configured as the master node for cluster B 160.

In an example, a switchover manager on cluster B 160 (e.g., switchover manager 102C or switchover manager 102D) performs a switchover from cluster A 110 to cluster B 160 by changing ownership of one or more storage aggregates and corresponding volumes (e.g., synchronized RAID mirror volumes) in shared storage 190 from a node on cluster A 110 to a node on cluster B 160 (e.g., node B1 170 or node B2 180). After storage aggregate and volume ownership changes, then the transitioned volumes are initialized when brought online with the cluster B 160 node as the owner. Further, any buffered data previously replicated from non-volatile random access memory (NVRAM) on cluster A 110 (e.g., NVRAM 122 or NVRAM 132) to NVRAM on cluster B 160 (e.g., NVRAM 172 or NVRAM 182) is replayed on volumes of storage aggregate 142B.

In an example, when replicated buffered data mirrored from cluster A 110 is replayed and written to the volumes, then the switchover to cluster B 160 is complete. Further, the switchover from cluster A 110 to cluster B 160 may be transparent to clients, and cluster B 160 may provide the same services as cluster A 110 with little or no interruption. In one example, operations that have been switched over to cluster B 160 may be switched back to cluster A 110, for example at a later time, after a full recovery of site A 110 (and vice versa).

In some examples, non-detectable data loss may occur between cluster A 110 at one site and cluster B 160 at a remote site prior to the switchover. For example, non-detectable data loss may occur between the clusters when network 150 communication is disrupted or discontinued for some period of time.

Non-detectable or "silent" data loss generally describes a scenario where updates written to NVRAM and/or shared storage 140 (e.g., of a synchronized RAID mirror) on one cluster (e.g., cluster A 110) are not replicated to a disaster recovery (DR) partner cluster (e.g., cluster B 160) before a switchover occurs. In such scenarios, cluster B 160, for example, may assume operations of cluster A 110 in response to a switchover command. However, any NVRAM and shared storage updates that failed to transfer from cluster A 110 to cluster B 160 prior to the switchover, for example due to communication loss, are unknown to cluster B 160 and lost without detection or notice. Further, if cluster B 160 immediately resumes operations of cluster A 110 in response to a switchover when silent data loss has occurred, future transactions that depend on the missing data may fail or result in data corruption and inconsistency.

In an example, one or more storage volumes involved in a switchover are automatically placed in a suspended state to prevent automatic access to the volumes on a disaster recovery (DR) partner after switchover occurs. In one example, the storage volumes are automatically placed in a suspended state as part of the switchover process to prevent clients and applications from accessing the volumes after switchover is completed to allow application-level recovery and/or verification of data integrity. In an example, one or more storage volumes are placed in a suspended state that prevents access to the volumes in response to a switchover to allow an administrator to perform recovery of the volumes before the volumes are brought online at the DR site.

In an example, an attribute is provided for each volume to indicate whether the volume is to be placed in a suspended state when a respective storage volume is involved in a switchover operation. For example, the volume-specific attribute may be set by default, set by an administrator during configuration, or may be updated by an administrator after a volume has been configured. In one example, the volume-specific attribute is examined for each of one or more volumes in response to a switchover command, and a volume is placed in a suspended state when its respective attribute indicates that the storage volume is to be placed in a suspended state when involved in a switchover.

In an example, a switchover command may indicate that one or more volumes are to be placed in a suspended state as part of the requested switchover, regardless of whether any of the volumes were previously configured to be suspended on switchover. For example, an administrator may issue a switchover command indicating that all volumes are to be placed in a suspended state as part of a requested switchover operation.

Figure 2:
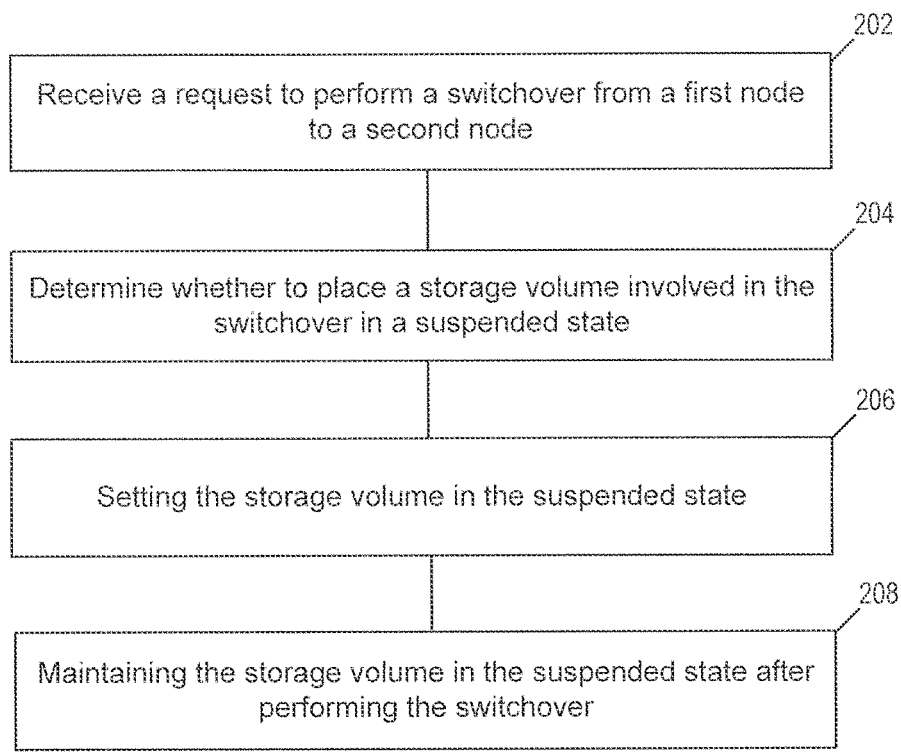
FIG. 2 is a flow diagram illustrating an example of a method for preventing non-detectable data loss during site switchover.

FIG. 2 is a flow diagram illustrating an example of a method for preventing non-detectable data loss during site switchover. The method 200 may be performed by processing logic that may comprise hardware (circuitry, dedicated logic, programmable logic, microcode, etc.), software (such as instructions run on a general purpose computer system, a dedicated machine, or processing device), firmware, or a combination thereof. In an example, the method 200 is performed by a switchover manager of a computer system or storage controller (e.g., one of switchover manager 102A-102D of FIG. 1). As an example, the method 200 is described in context of switchover manager 102C.

Method 200 begins at block 202 when switchover manager 102C receives a request to perform a switchover from a first node to a second node. In an example, an administrator issues a switchover command on node B1 170 to transfer operations of cluster A 110 to cluster B 180. For example, the administrator may issue the switchover command prior to a scheduled maintenance period or an unplanned site outage involving cluster A 110. In one example, an administrator or other user may issue a switchover command using a command line or graphical user interface (GUI). Switchover invocation also may be automated, for example, based on time, one or more detected events, or other criteria.

At block 204, switchover manager 102C determines whether to place a storage volume involved in the switchover in a suspended state. In an example, switchover manager 102C examines a volume-specific attribute provided for each volume to determine whether a respective volume is to be placed in a suspended state as part of a switchover. For example, switchover manager 102C may analyze a "suspend-volume-on-switchover" or similar attribute provided and maintained for a volume by file system 134 to determine whether the volume is to be placed in a suspended state in response to the switchover.

In an example, switchover manager 102C analyzes a "suspend-volume-on-switchover" or similar attribute for a volume. In one example, a "suspend-volume-on-switchover" attribute is provided in metadata or configuration data local to the volume. In another example, a "suspend-volume-on-switchover" attribute associated with a volume is provided in a file, database, or other file system location apart from the volume.

In an example, switchover manager 102C examines information provided with a switchover request to determine whether the request indicates that a storage volume is to be placed in a suspended state. For example, a switchover request may name one or more specific volumes or logical groupings of volumes that are to be placed in a suspended state. In one example, a switchover request indicates that every volume involved in the switchover is to be placed in a suspended state. For example, a switchover request may include a "suspend-all-volumes-on-switchover" or similar switchover request parameter that indicates every volume involved in a switchover is to be placed in a suspended state as part of the switchover.

At block 206, switchover manager 102C sets the storage volume in the suspended state. In an example, switchover manager 102C sets a storage volume in a suspended state based on determining that the volume is to be placed in a suspended state as part of a switchover.

A "suspended" state generally refers to a state where volume access is prevented or blocked. For example, read and write access may not be permitted on a volume in a suspended state and attempts to perform such operations on a suspended volume usually generate an error or other notification for one or more types of clients.

In one example, a node receives a request from a non-administrative client to access a volume that has been placed in a suspended state after a switchover has been completed. In response, the node determines that the volume is in a suspended state, generates a message indicating that the storage volume is in a suspended state, and provides the message in response to the request without performing the requested operation(s) on the suspended volume.

In an example, administrative clients may access and perform operations on suspended volumes while non-administrative client access is blocked. For example, a system administrator or an internal node process having elevated privileges may perform administrative or other operations on suspended volumes while access to suspended volumes is prevented for other types of clients (e.g., applications). In one example, access to suspended volumes is allowed for clients using one or more protocols while access is prevented for clients using one or more other protocols. For example, access to suspended volumes may be blocked for Network File System (NFS) and Storage Area Network (SAN) clients. However, Common Internet File System (CIFS) clients may be provided access to suspended volumes.

In an example, switchover manager 102C performs a switchover by changing ownership of one or more volumes to a recovery node of a disaster recovery (DR) partner, writing replicated/mirrored buffer data received from a failed node to disk, and bringing the volumes online with the recovery node as the owner. In one example, switchover manager 102C brings one or more of the volumes online in a suspended state based on a volume-specific attribute associated with each volume or based on information provided with a switchover request.

At block 208, switchover manager 102C maintains the storage volume in the suspended state after performing the switchover. In an example, switchover manager 102C places a volume in a suspended state while performing a switchover and maintains the storage volume in the suspended state after completing the switchover. For example, a volume may be maintained in a suspended state after switchover is completed to prevent one or more applications from automatically resuming operations on a volume after switchover to a disaster recovery (DR) site occurs. Maintaining the volume in the suspended state prevents access to the volume and allows application-specific recovery to be performed on the volume, for example, to avoid non-detectable data loss.

In an example, an administrator may disable application services and volume access before performing application-specific recovery on a volume. The application-specific recovery may include restoring application data from a backup and applying a series of logged transactions to perform point in time recovery. In one example, a volume in a suspended state is recovered by an administrator and brought back online in an accessible (non-suspended) state allowing client access.

Figure 3:
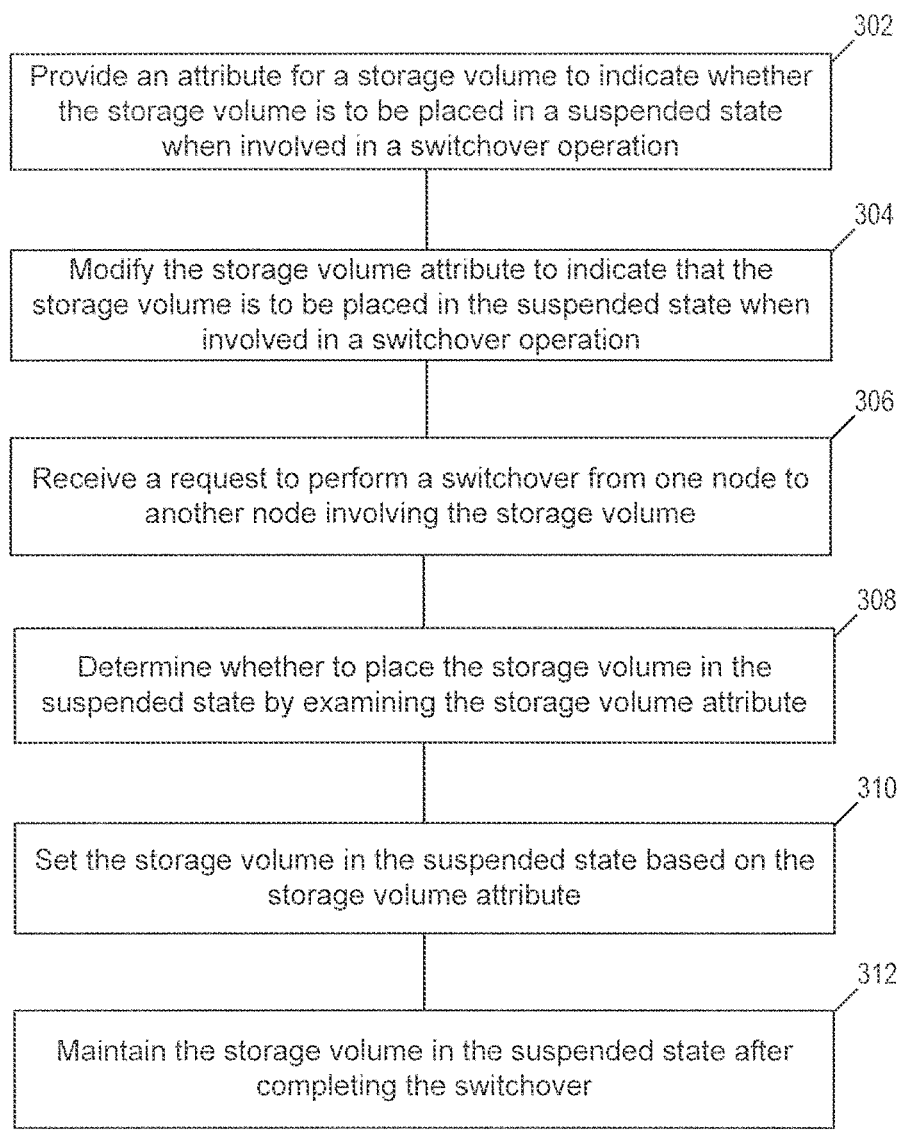
FIG. 3 is a flow diagram illustrating an example of a method for preventing non-detectable data loss for one or more predetermined storage volumes when performing site switchover.

FIG. 3 is a flow diagram illustrating an example of a method for preventing non-detectable data loss for one or more predetermined storage volumes when performing site switchover. The method 300 may be performed by processing logic that may comprise hardware (circuitry, dedicated logic, programmable logic, microcode, etc.), software (such as instructions run on a general purpose computer system, a dedicated machine, or processing device), firmware, or a combination thereof. In an example, the method 300 is performed by a switchover manager of a computer system or storage controller (e.g., one of switchover manager 102A-102D of FIG. 1). As an example, the method 300 is described in context of switchover manager 102C.

Method 300 begins at block 302 where a storage volume attribute is provided to indicate whether the storage volume is to be placed in a suspended state when involved in a switchover operation. In an example, a volume-specific attribute is provided by a file system for a volume to indicate whether the volume is to be placed in a suspended state as part of a switchover. For example, a "suspend-volume-on-switchover" or similar attribute is provided for each volume in a plurality of volumes. In one example, a "suspend-volume-on-switchover" or similar attribute is stored by a file system as metadata or configuration data that is local to a volume. In another example, the attribute may be provided apart from the volume, for example, in a file, database, or other location accessible to switchover manager 102C.

In an example, a storage volume attribute indicating whether to place a storage volume in a suspended state on switchover is provided using a node of cluster A 110. For example, a node in cluster A 110 may be used to configure the volume and set the volume-specific attribute during or after volume setup. In one example, the volume-specific attribute is specified using a node in cluster A 110 and is later replicated to (or mirrored with) a corresponding volume in cluster B 160. In one example, the volume-specific attribute is provided from a mirrored version or copy of the volume in cluster B 160 (e.g., via a node in cluster B 160) before, during, or after a switchover occurs.

In some examples, a storage volume attribute associated with a storage drive may be used to indicate whether to place a storage volume in a suspended state on switchover. Similarly, a storage volume attribute associated with a logical unit number (LUN) of a logical volume or of a storage drive may be used to indicate whether a storage volume is to be suspended on switchover.

In an example, providing a volume-specific attribute to indicate whether a volume is to be suspended on switchover allows an administrator control whether or not each specific volume is made available for client processing after a site switchover occurs. For example, a volume that is not set to be suspended on switchover is usually brought online automatically to begin processing client requests immediately after a switchover is complete. On the other hand, a volume set to be suspended on switchover is placed in a suspended state during the switchover that prevents access to the volume until an administrator is able to perform application-level data recovery or to confirm integrity of the data. Thus, suspending a volume in response to a switchover can protect applications and data from potential non-detectable data loss and/or corruption associated with a switchover scenario.

At block 304, a switchover manager modifies the storage volume attribute to indicate that the storage volume is to be placed in the suspended state when involved in a switchover operation. For example, a switchover manager may modify the storage volume attribute prior to a switchover in response to a command executed by an administrator or based on one or more system configuration settings. In an example, an administrator sets the volume-specific attribute provided by a file system when initially configuring the volume (e.g., using a node of a cluster where the volume is configured, such as a node in cluster A 110). The administrator also may update the volume-specific attribute one or more times via a file system after the volume has been setup by updating the attribute to a desired value (e.g., using the node from a cluster where the volume is configured, such as cluster A 110, or using a node from a disaster recovery partner site, such as a node in cluster B 160). In an example, the volume is a logical volume associated with one or more physical storage resources. In one example, the volume is a physical volume.

In an example, a storage/cluster administrator configures each volume in a set of volumes to be placed in a suspended state when involved in a switchover. In one example, an administrator installs mission critical services (e.g., applications, databases, etc.) or any system sensitive to data loss (e.g., manufacturing systems, banking systems, etc.) on the volumes. For example, the administrator may use the "suspend-on-switchover" volumes to protect important applications, databases, and systems from non-detectable data loss associated with a disaster recovery (DR) switchover across sites.

In an example, a storage/cluster administrator configures some volumes to be placed in a suspended state on switchover and configures other volumes to resume normal operations on switchover. Thus, some volumes may be brought online and may begin processing requests immediately after a switchover occurs. However, other volumes are placed in a suspended state that prevents read and write access to those volumes until an administrator takes further action, for example, by clearing the suspended state for one or more of the volumes.

At block 306, switchover manager 102C receives a request to perform a switchover from one node to another node involving the storage volume. In an example, an administrator issues a switchover command on node B1 170 to initiate a switchover of operations from cluster A 110 to cluster B 160. In one example, an administrator initiates a switchover from cluster A 110 to cluster B 160 on node B2 180, regardless of which node serves as the master node of cluster B 160. In another example, a node on cluster A 110 may be used to initiate a switchover from cluster B 160 to cluster A 110.

At block 308, switchover manager 102C determines whether to place the storage volume in the suspended state by examining the storage volume attribute. In an example, switchover manager 102C reads and analyzes a storage volume attribute indicating whether a storage volume is to be placed in a suspended state as part of a switchover. In one example, switchover manager 102C accesses the storage volume attribute from local volume metadata or local volume configuration data. In another example, switchover manager 102C accesses the storage volume attribute from a location that is apart from the volume (e.g., file, database, etc.)

At block 310, switchover manager 102C sets the storage volume in the suspended state based on the storage volume attribute. In an example, switchover manager 102C determines that a volume is to be placed in a suspended state for a switchover based on analyzing a volume specific attribute associated with the volume. In response, switchover manager 102C updates the status of the volume to "suspended" or a similar state when performing the switchover.

In an example, switchover manager 102C performs a switchover by transferring operations from cluster A 110 to cluster B 160. In one example, switchover manager 102C may transfer ownership of one or more volumes from a node on cluster A 110 to a node on cluster B160. For example, switchover manager 102C may change ownership of a storage aggregate, one or more plexes in the storage aggregate, and associated volumes and storage drives from a node on cluster A 110 to a node on cluster B160 (or vice versa depending on the direction of the switchover). Switchover manager 102C then may write to disk any replicated buffer data previously received from nodes on cluster A 110 (e.g., which has not been written to disk already). Switchover manager 102C then may set each of the one or more volumes in a suspended state based on a respective volume-specific-attribute of each volume.

At block 312, switchover manager 102C maintains the storage volume in the suspended state after completing the switchover. In an example, switchover manager 102C completes the switchover so that operations for cluster A 110 are transferred to cluster B 160. Volumes placed in a suspended state during the switchover process are maintained in the suspended state after the switchover so that processing for those volumes is not automatically resumed on cluster B 160 until steps can be taken to prevent possible non-detectable data loss.

In an example, one or more storage volumes are maintained in a suspended state that is persisted until volume state is modified. In one example, a volume placed in a suspended state remains in the suspended state until an administrator or process clears the volume state, for example, by changing the state. Thus, a volume placed in a suspended state prior to a node reboot or other event remains in the suspended state after a node reboot until volume state is modified to a non-suspended state.

Figure 4:
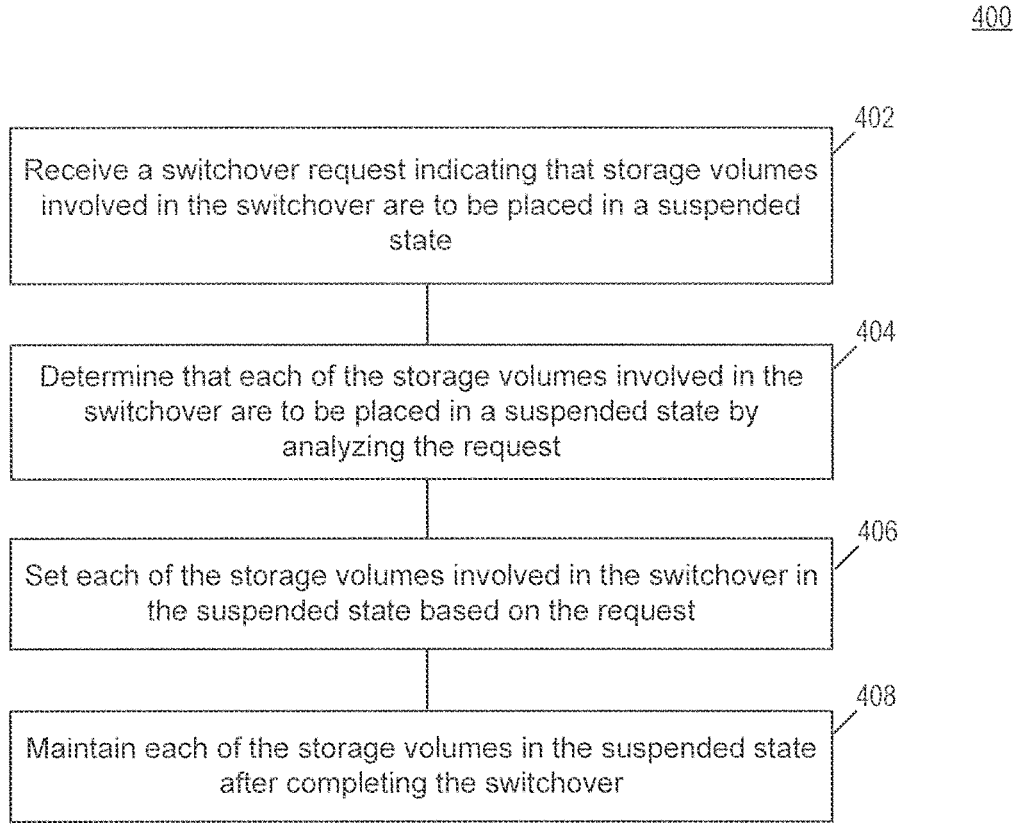
FIG. 4 is a flow diagram illustrating an example of a method for preventing non-detectable data loss in each storage volume involved in a site switchover.

FIG. 4 is a flow diagram illustrating an example of a method for preventing non-detectable data loss in each storage volume involved in a site switchover. The method 400 may be performed by processing logic that may comprise hardware (circuitry, dedicated logic, programmable logic, microcode, etc.), software (such as instructions run on a general purpose computer system, a dedicated machine, or processing device), firmware, or a combination thereof. In an example, the method 400 is performed by a switchover manager of a computer system or storage server (e.g., one of switchover manager 102A-102D of FIG. 1). As an example, the method 400 is described in context of switchover manager 102C.

Method 400 begins at block 402 when switchover manager 102C receives a switchover request indicating that storage volumes involved in the switchover are to be placed in a suspended state. In an example, a switchover request is accompanied by a special command or parameter indicating that every volume is to be placed in a suspended state in response to the switchover. In one example, a "suspend-all-volumes-on-switchover" or similar parameter is used to indicate that every volume involved in a switchover is to be placed in a suspended state. For example, "suspend-all-volumes-on-switchover" or a similar parameter may be provided with a switchover command as a fallback allowing volumes that previously were not specifically set at the volume-level to be suspended on switchover.

At block 404, switchover manager 102C determines that each of the storage volumes involved in the switchover are to be placed in the suspended state by analyzing the request. In an example, switchover manager 102C analyzes a switchover request to determine whether the request indicates that every storage volume involved in the switchover is to be placed in a suspended state as part of the switchover. For example, switchover manager 102C may analyze parameters or other information provided with a switchover request. In one example, switchover manager 102C examines a request to locate a special parameter (e.g., "suspend-all-volumes-on-switchover" or a similar parameter) indicating that every volume involved in the requested switchover is to be placed in a suspended state.

At block 406, switchover manager 102C sets each of the storage volumes involved in the switchover in the suspended state based on the request. In an example, switchover manager 102C performs a switchover from cluster A 110 at a first site to cluster B 160 at a remote site and places every volume involved in the switchover in a suspended state based on information provided in the switchover request. In one example, switchover manager 102C sets each of one or more volumes in a storage aggregate in a suspended state when performing the switchover. In one example, switchover manager 102 sets every volume in shared storage at a site in a suspended state.

At block 408, switchover manager 102C maintains each of the storage volumes in the suspended state after completing the switchover. In an example, switchover manager 102C completes a requested switchover where it has placed every volume involved in the switchover in a suspended state. In one example, switchover manager 102C leaves the volumes in the suspended state after the switchover is complete to prevent access to the volumes until application-level recovery can be performed and/or until data integrity and completeness can be verified.

Figure 5:
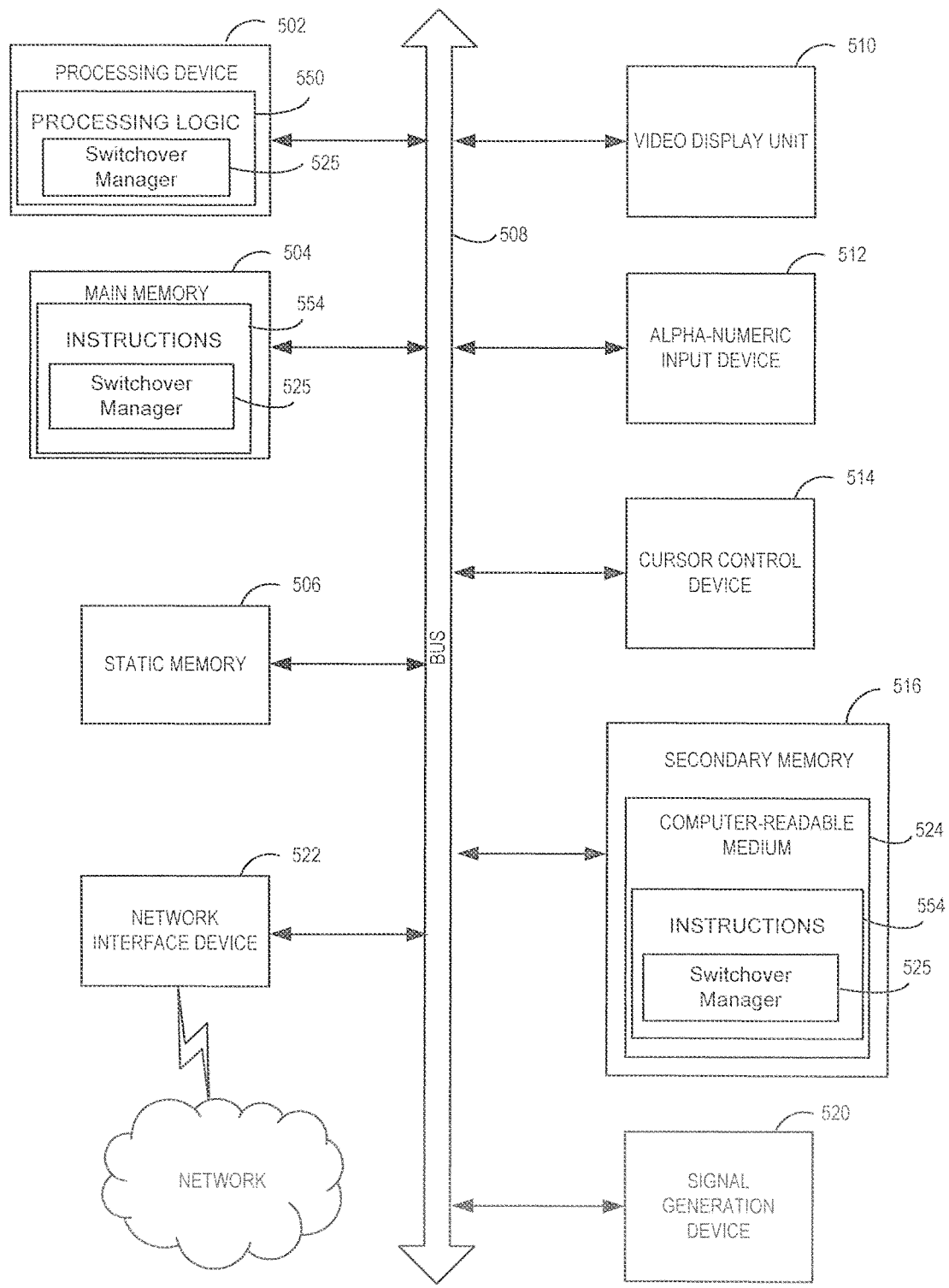
FIG. 5 illustrates a diagrammatic representation of a machine in the example form of a computer system.

FIG. 5 illustrates a diagrammatic representation of a machine in the exemplary form of a computer system 500 within which a set of instructions, for causing the machine to perform any one or more of the methodologies discussed herein, may be executed. In an example, computer system 500 may correspond to a node (e.g., node A1 120, node A2 130, node B1 170, or node B2 180) in system architecture 100 of FIG. 1.

In examples of the present disclosure, the machine may be connected (e.g., networked) to other machines via a Local Area Network (LAN), a metropolitan area network (MAN), a wide area network (WAN), a fibre channel connection, an inter-switch link, an intranet, an extranet, the Internet, or any combination thereof. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a storage controller, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 516 (e.g., a data storage device), which communicate with each other via a bus 508.

The processing device 502 represents one or more general-purpose processing devices such as a microprocessor, central processing unit, or the like. The processing device may include multiple processors. The processing device 502 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

In an example involving a storage controller, a video display unit 510, an alphanumeric input device 512, and a cursor control device 514 are not part of the storage controller. Instead, an application running on a client or server interfaces with a storage controller, and a user employs a video display unit 510, an alphanumeric input device 512, and a cursor control device 514 at the client or server.

The secondary memory 516 may include a machine-readable storage medium (or more specifically a computer-readable storage medium) 524 on which is stored one or more sets of instructions 554 embodying any one or more of the methodologies or functions described herein (e.g., switchover manager 525). The instructions 554 may also reside, completely or at least partially, within the main memory 504 and/or within the processing device 502 during execution thereof by the computer system 500 (where the main memory 504 and the processing device 502 constitute machine-readable storage media).

While the computer-readable storage medium 524 is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the operations or methodologies of the present disclosure. The term "computer-readable storage medium" shall accordingly be taken to include, but not be limited to, solid-state memories, and optical and magnetic media.

The computer system 500 additionally may include a switchover manager module (not shown) for implementing the functionalities of a switchover manager (e.g., switchover manager 102A, switchover manager 102B, switchover manager 102C, or switchover manager 102D of FIG. 1). The modules, components and other features described herein (for example, in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices have been shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "updating", "determining", "storing", "computing", "comparing", "initializing", "returning", "providing," "analyzing," "notifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples and implementations will be apparent to those of skill in the art upon reading and understanding the above description. The scope of the disclosure should therefore be determined with reference to the appended claims, along with the full scope of equivalents to which such claims are entitled.

What is claimed is:

1. A method, comprising:
    assigning ownership of a first storage volume and a second storage volume from a first node to a second node for a switchover operation while the first storage volume is in a suspended state and the second storage volume is in an active state;

after the switchover, recovering an application from the first storage volume while the first storage volume is in the suspended state; and transitioning the first storage volume from the suspended state to the active state upon completing the application recovery.

2. The method of claim 1, comprising:

selectively allowing and denying requests from other nodes to access the first storage volume while in the suspended state based upon node privileges.

3. The method of claim 1, wherein the first storage volume is placed in the suspended state for the switchover based upon an attribute of the first storage volume.

4. The method of claim 1, wherein the application recovery is performed to avoid non-detectable data loss.

5. The method of claim 1, comprising:

placing the first storage volume into the suspended state to disable application services and volume access to the first storage volume.

6. The method of claim 1, comprising:

restoring application data from a backup of the first storage volume.

7. The method of claim 1, comprising:

applying a series of logged transactions to the first storage volume while in the suspended state for completing the application recovery.

8. A computing device, comprising:

a memory comprising machine executable code having stored thereon instructions; and a processor coupled to the memory, the processor configured to execute the machine executable code to cause the processor to:

assign ownership of a first storage volume and a second storage volume from a first node to a second node for a switchover operation while the first storage volume is in a suspended state and the second storage volume is in an active state;

after the switchover, recover an application from the first storage volume while the first storage volume is in the suspended state; and transition of the first storage volume from the suspended state to the active state upon completing the application recovery.

9. The computing device of claim 8, wherein the machine executable code causes the processor to:

selectively allow and deny requests from other nodes to access the first storage volume while in the suspended state based upon node privileges.

10. The computing device of claim 8, wherein the first storage volume is placed in the suspended state for the switchover based upon an attribute of the first storage volume.

11. The computing device of claim 8, wherein the application recovery is performed to avoid non-detectable data loss.

12. The computing device of claim 8, wherein the machine executable code causes the processor to:

place the first storage volume into the suspended state to disable application services and volume access to the first storage volume.

13. The computing device of claim 8, wherein the machine executable code causes the processor to:

restore application data from a backup of the first storage volume.

14. The computing device of claim 8, wherein the machine executable code causes the processor to:

apply a series of logged transactions to the first storage volume while in the suspended state for completing the application recovery.

15. A non-transitory computer-readable medium having stored thereon instructions which when executed by a machine, causes the machine to:

assign ownership of a first storage volume and a second storage volume from a first node to a second node for a switchover operation while the first storage volume is in a suspended state and the second storage volume is in an active state;

after the switchover, recover an application from the first storage volume while the first storage volume is in the suspended state; and transition the first storage volume from the suspended state to the active state upon completing the application recovery.

16. The non-transitory computer-readable medium of claim 15, wherein the instructions cause the machine to:

selectively allow and deny requests from other nodes to access the first storage volume while in the suspended state based upon node privileges.

17. The non-transitory computer-readable medium of claim 15, wherein the first storage volume is placed in the suspended state for the switchover based upon an attribute of the first storage volume.

18. The non-transitory computer-readable medium of claim 15, wherein the application level recovery is performed to avoid non-detectable data loss.

19. The non-transitory computer-readable medium of claim 15, wherein the instructions cause the machine to:

place the first storage volume into the suspended state to disable application services and volume access to the first storage volume.

20. The non-transitory computer-readable medium of claim 15, wherein the instructions cause the machine to:

restore application data from a backup of the first storage volume.

* * * * *